United States Patent
Deeg et al.

(10) Patent No.: US 8,283,817 B2
(45) Date of Patent: Oct. 9, 2012

(54) ELECTRIC MACHINE HAVING A TWIN AXIAL FAN

(75) Inventors: Christian Deeg, Altdorf (DE);
Ekkehard Ressel, Heilsbronn (DE);
Sebastian Weiβ, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 12/809,784

(22) PCT Filed: Nov. 6, 2008

(86) PCT No.: PCT/EP2008/065068
§ 371 (c)(1),
(2), (4) Date: Sep. 21, 2010

(87) PCT Pub. No.: WO2009/080400
PCT Pub. Date: Jul. 2, 2009

(65) Prior Publication Data
US 2011/0006622 A1    Jan. 13, 2011

(30) Foreign Application Priority Data

Dec. 20, 2007  (DE) .......................... 10 2007 061 597

(51) Int. Cl.
*H02K 9/00* (2006.01)
(52) U.S. Cl. ................. 310/59; 310/52; 310/61; 310/62
(58) Field of Classification Search .............. 310/52–59, 310/61–63, 60 A
See application file for complete search history.

(56) References Cited

U.S. PATENT DOCUMENTS

| | | | | |
|---|---|---|---|---|
| 2,043,655 A * | 6/1936 | Ehrmann | ......................... | 310/57 |
| 3,809,934 A * | 5/1974 | Baer et al. | ....................... | 310/53 |
| 3,969,643 A * | 7/1976 | Sapper | ............................ | 310/53 |
| 6,943,469 B2 * | 9/2005 | Nelson | ............................ | 310/55 |
| 2004/0084974 A1 * | 5/2004 | Nelson | ............................ | 310/58 |
| 2004/0084976 A1 * | 5/2004 | Thiot | ............................ | 310/58 |
| 2007/0024129 A1 * | 2/2007 | Pfannschmidt et al. | ........ | 310/59 |
| 2009/0146512 A1 * | 6/2009 | Yoshizawa et al. | ............. | 310/53 |
| 2009/0273246 A1 * | 11/2009 | Weiss | ............................. | 310/61 |

FOREIGN PATENT DOCUMENTS

| CH | 260 180 A | 2/1949 |
|---|---|---|
| DE | 724 449 C | 8/1942 |
| DE | 79 00 792 U1 | 4/1979 |
| DE | 25 58 405 82 | 4/1980 |
| DE | 195 48 321 C1 | 2/1997 |
| DE | 196 53 839 A1 | 6/1998 |
| DE | 103 23 010 A1 | 12/2004 |
| JP | 2001 298906 A | 10/2001 |
| JP | 2003 219605 A | 7/2003 |
| SU | 1 473 018 A1 | 4/1989 |

* cited by examiner

*Primary Examiner* — Thanh Lam
(74) *Attorney, Agent, or Firm* — Henry M. Feiereisen LLC

(57) ABSTRACT

An electric machine with improved cooling efficiency includes a stator, a rotor operating as a rotor fan and comprising a shaft defining an axial direction and having radial and axial cooling channels, and an axial fan configured as a twin axial fan and arranged coaxially with the shaft and supplying a coolant to the axial cooling channels. The axial fan has first and second blade rings and a funnel-shaped tube with a smaller opening directly connected to the axial cooling channels of the rotor to deliver coolant to the axial cooling channels of the rotor, and a larger opening, which is non-rotatably connected to and encloses the first blade ring. The second blade ring is firmly attached at an outer circumference of the funnel-shaped tube to deliver the coolant to the stator. Both the stator and the rotor can be cooled using an efficient coolant flow.

8 Claims, 1 Drawing Sheet

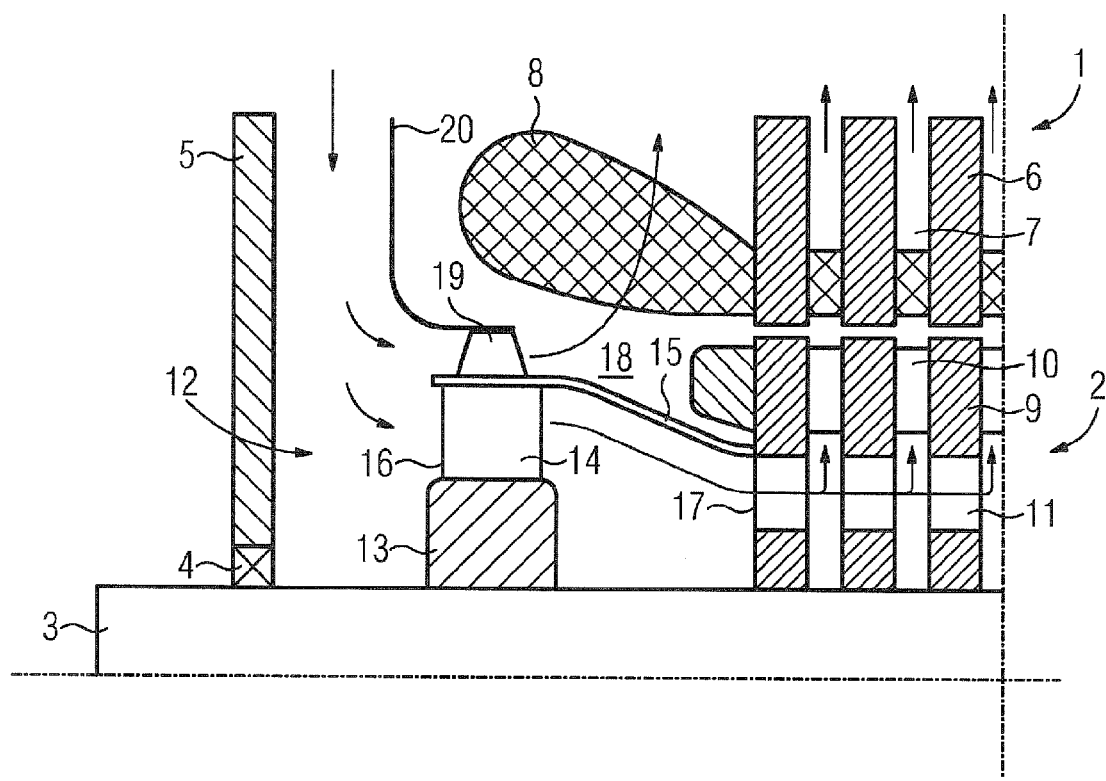

ELECTRIC MACHINE HAVING A TWIN AXIAL FAN

CROSS-REFERENCES TO RELATED APPLICATIONS

This application is the U.S. National Stage of International Application No. PCT/EP2008/065068, filed Nov. 6, 2008, which designated the United States and has been published as International Publication No. WO 2009/080400 and which claims the priority of German Patent Application, Ser. No. 10 2007 061 597.5, filed Dec. 20, 2007, pursuant to 35 U.S.C. 119(a)-(d).

BACKGROUND OF THE INVENTION.

The present invention relates to an electric machine having a stator, a rotor comprising a shaft and provided with radial and axial cooling channels and acting as a rotor fan, and having an axial fan that is disposed coaxially with the shaft and delivers coolant into the axial cooling channels. The axial fan, for its part, has a first blade ring, which is enclosed by a funnel-shaped tube and is non-rotatably connected to the same. The smaller opening of the funnel-shaped tube is directly connected to the axial cooling channels of the rotor.

Electric machines of higher power rating must be equipped with effective cooling systems. High utilization of the electric machine can be achieved only with a powerful cooling system, if necessary a bilateral ventilation. In many cases, the rotor of an electric machine itself exhibits a certain fan effect when it is provided with radially extending channels. Axial channels that are connected to these radial channels provide for an air flow from the front sides of the rotor to the respective radial channels. The rotor then operates according to the principle of a radial fan. The thus produced air flow cools not only the rotor itself, but may also cool the laminated core of the stator.

The cooling effect of the rotor fan is determined by the air intake and outlet diameter, the fluid friction and dynamic pressure losses at disturbance sites in the rotor. One of these disturbance sites is the air intake of the typically stationary air into the rotating axial channels.

In order to optimize the fan effect of the rotor, hitherto attention has been paid only to keeping the axial on-flow area and the radial off-flow area in an appropriate ratio to one another, and otherwise not creating any unnecessary constrictions for the air, or the coolant. The air intake resistance is usually not optimized.

In order also to cool the winding overhangs of the electric machine, frequently an axial fan is mounted on the machine shaft, at a certain distance from the rotor front side. In order to avoid problems resulting from mutual influencing of the axial fan and rotor fan, there are embodiments in which the suction side of the rotor fan is separated from the pressure side of the axial fan by a tube, on which the hub of the axial fan is placed.

An electric machine of the generic type is known from the publication SU 147 30 18 A1. It has a stator laminated core and a rotor laminated core, each having radial cooling channels. The rotor additionally has axial cooling channels, in order to direct coolant from the front side of the rotor to the radial cooling channels. Arranged on the front side of the rotor is a ventilator having a funnel-shaped casing, which delivers the coolant into the axial channels of the rotor. The coolant flows out of the winding overhang space into the ventilator. Flowing past the winding overhang causes the coolant to become already heated before it flows into the ventilator, or rotor. Consequently, adequate cooling of the rotor cannot be ensured in all cases.

Furthermore, the publication DE 196 53 839 A1 discloses a rotor of a turbo-generator having direct gas cooling. Provided between a rotor cap plate and a rotor shaft there is a two-stage blade grid, for causing cooling air to flow onto the rotor and the rotor winding. The first blade grid stage in the direction of flow is a delay grid having pressure-generating characteristics, and the blade grid stage that follows in the direction of flow is a delay grid having deflection characteristics.

Furthermore, the publication DE 79 00 792 U1 discloses a self-ventilated electric machine. An axial fan serves to deliver a cooling air flow, which axial fan is arranged on a hollow hub whose inner diameter is greater than the diameter on which the axial cooling channels of the rotor are located. For mechanical stiffness, some ribs are provided between the hub and the rotor shaft.

Further, the patent specification DE 195 48 321 C1 describes a cooling device, particularly for turbo-generators. A cooler is connected, via delivery channels, to the rotor, in which cooling channels are realized for the purpose of cooling the conductor of the rotor. At least one blade ring is provided in at least one delivery channel, which blade ring imparts to the cooling fluid a tangential speed component in the direction of rotation of the rotor and thus promotes the flow of cooling fluid onto the rotor.

The object of the present invention consists in improving the cooling of an electric machine having radially extending cooling channels.

SUMMARY OF THE INVENTION

According to the invention, this object is achieved by an electric machine having a stator, a rotor comprising a shaft and provided with radial and axial cooling channels and acting as a rotor fan, and having an axial fan that is disposed coaxially with the shaft and delivers coolant into the axial cooling channels, the axial fan having a first blade ring, which is enclosed by a funnel-shaped tube and is non-rotatably connected to the same, the smaller opening of the funnel-shaped tube being directly connected to the axial cooling channels of the rotor, and the axial fan having a second blade ring, which is firmly attached at the outer circumference of the tube in order to deliver coolant to the stator.

Advantageously, a twin axial fan is thereby provided, having separate outlets for the rotor and stator.

Very powerful cooling can thereby be achieved in both active parts.

Preferably, blades of the first blade ring of the axial fan extend in the axial direction on the side that faces towards the rotor. This means that they are disposed in a plane defined by a radial direction and the axial direction. It is advantageous in the case of this alignment that the coolant through the blades then assumes the circulation speed of the axial cooling channels.

The first blade ring can be non-rotatably connected to the shaft. As a result, no external drive is required for the axial fan.

Moreover, the large opening of the tube that encloses the first blade ring can serve as a coolant intake and be directly connected to an inflow nozzle, through which the coolant can be delivered to the first and the second blade ring. By means of this inflow nozzle, the coolant is directed in a targeted manner into the region of the axial fan.

Furthermore, the stator can have a stator laminated core having radial cooling channels, which correspond with the radial cooling channels of the rotor. The coolant flow generated by the axial fan and the rotor fan can thus also be used for the stator.

According to a further embodiment, the stator can have a winding overhang, to which coolant is delivered directly by the second blade ring. The winding overhang, which frequently becomes very hot, can thus be cooled efficiently.

The electric machine can additionally have a housing, in which the inflow nozzle directs an externally supplied coolant exclusively to the axial fan. The coolant can thereby be prevented from heating in the winding overhang space before it is delivered to the rotor.

According to a further embodiment of the electric machine, an above-mentioned axial fan can be disposed, respectively, on both sides of the rotor. The powerful cooling concept according to the invention is thus also applicable to bilaterally ventilated electric machines.

BRIEF DESCRIPTION OF THE DRAWING.

The present invention is now explained more fully with reference to the appended drawing, in which:

FIG. 1 shows a partial longitudinal section of an electric machine having a cooling principle according to the invention.

DETAILED DESCRIPTION OF PREFERRED EMBODIMENTS.

The exemplary embodiment presented more fully in the following constitutes a preferred embodiment of the present invention.

The part of an electric machine represented in FIG. 1 consists, substantially, of a stator 1 and a rotor 2, including a shaft 3. The shaft is mounted on a bearing shield 5 by means of a bearing 4.

The stator 1 consists of a plurality of stator partial laminated cores 6, between which radial stator cooling channels 7 are realized. There is a winding overhang 8 on the front side of the stator 1.

The rotor 2 is similarly composed of a plurality of rotor partial laminated cores 9, between which radial rotor cooling channels 10 are realized. The individual rotor partial laminated cores 9 have through holes in the axial direction, such that axial cooling channels 11 are produced, which are connected to the radial rotor cooling channels.

On the front side of the rotor 2, an axial fan 12 is non-rotatably mounted on the shaft 3. The connection to the shaft 3 is effected through a hub 13, which is pressed onto the shaft 3. On the outer circumference of the hub 13 there is a first blade ring 14 having fan blades uniformly distributed on the circumference. The fan blades have an outlet angle of 90°, i.e. the part of the fan blade that faces towards the rotor 2 lies in a plane spanned by a radially extending and an axially extending straight line. Thus, after passing the fan blade, a coolant flow strikes the front face of the rotor perpendicularly.

The inner, or first, blade ring 14 is enclosed by a conical, or funnel-shaped, tube 15. This tube 15 is likewise part of the axial fan 12, and rotates together with the latter, and with the rotor 2. Further, the funnel-shaped tube 15 has a large intake opening 16 and, at the opposite end, a smaller outlet opening 17. The inner radius of the outlet opening 17 is at least as great as the outermost radial position of the axial cooling channels 11. In addition, the axial cooling channels 11 directly adjoin the outlet opening 17 in the axial direction. It is thereby ensured that the coolant delivered through the funnel-shaped tube 15 is forced exclusively into the axial cooling channels, but not into the winding overhang space 18.

On the outer surface of the tube 15, radially above the first blade ring 14, there is an outer, or second, blade ring 19. It consists of outer fan blades, which are non-rotatably mounted on the tube 15 with uniform distribution in the circumferential direction. They serve to deliver the coolant outside of the tube 15 in the direction of the winding overhang 8. In order that the coolant is supplied directly to the intake of the axial fan without being preheated by the winding overhangs, an inflow nozzle 20 is provided between the bearing shield 5 and the winding overhang 8. The inflow nozzle 20 constitutes an annular channel around the shaft 3, in which the axial fan 12 is disposed.

A coolant flow is thus obtained in the electric machine, starting from the outside, or from a cooler, between the bearing shield 5 and the inflow nozzle 20, through to the twin axial fan 12. There, a portion of the coolant flow, driven by the inner, first, blade ring 14, is directed to the axial channels 11, and is then forced radially outwards through the radial rotor cooling channels 10 and the radial stator cooling channels 7, which are flush therewith. Another portion of the coolant flow is guided by the outer, second, blade ring 19 of the twin axial fan 12 outside the tube 15 into the winding overhang space 18, or to the winding overhang 8. "Unused" coolant is thus forced equally to the winding overhang 8 and to the rotor 2.

The functioning principle of the twin axial fan according to the invention, having separate outlets for the rotor and the winding overhang, is explained more fully in the following. In order to minimize the coolant or air intake resistance of the rotor fan, a swirl current of the coolant is generated and thus guided to the rotor. This is achieved by the axial fan 12, which is on the incoming side of the rotor fan and whose blades have an outlet angle of, if possible, 90°. A further effect that promotes cooling is effected by the constriction through the tube after the axial fan 12. Upon flowing through the constriction, the axial component of the flow is increased, as a result of which the total flow vector assumes a more axial alignment, since the tangential and radial components are not increased. Thus, even in the case of outlet angles of less than 90°, a swirled delivery to the rotor fan can be ensured. The intake angle, i.e. the on-flow angle of the coolant relative to the fan blades, is matched to the rotational speed and to the anticipated volumetric flow.

Here, as mentioned, the axial fan 12 is realized as a twin axial fan. Owing to the tube 15 between its two blade rings, it generates two independent coolant flows for the rotor and the stator, or the winding overhangs. In addition to the function of separating the two coolant flows, the tube 15 additionally has the function, already mentioned, of increasing the pressure of the coolant, since the tube is conical, or funnel-shaped, in form. The second, outer, axial fan of the twin axial fan serves, as likewise already indicated, to supply sufficient coolant to the winding overhangs of the electric machine.

Thus, in addition to the generation of two independent coolant flows, the twin axial fan thus additionally has the third functionality of increasing the pressure. The structure of the electric machine according to the invention thus has the advantage of a more controllable distribution of the coolant flows through the laminated core region and the winding overhangs. Moreover, an optimal on-flow onto the rotor fan is achieved through a reduced coolant intake resistance, as a result of which the effectiveness of the rotor fan is improved. Further, the axial fan, connected on the incoming side, provides for an additional build-up of pressure on the rotor fan. Finally, an increase in the power rating of the electric machine is made possible by the improved cooling.

The electric machine can be realized, for example, as an electric motor, but also as a generator. Moreover, the cooling principle can also be used for electric machines having a structure other than that of the above-mentioned example. Thus, the winding overhangs can also be disposed on the rotor, such that, for example, the coolant flow, or cooling-air flow, generated by the outer blade ring 19 is directed onto the winding overhangs of the rotor and additionally onto the front side of the stator. Clearly, any other structural forms of the electric machine are also conceivable. In particular, it is advantageous to ventilate the electric machines on two sides, by means of twin axial fans in each case.

What is claimed is:

1. An electric machine comprising
    a stator,
    a rotor operating as a rotor fan and comprising a shaft defining an axial direction and having radial and axial cooling channels, and
    an axial fan configured as a twin axial fan and arranged coaxially with the shaft and supplying a coolant to the axial cooling channels,
    wherein the axial fan comprises a first blade ring and a second blade ring and a funnel-shaped tube having a smaller opening, which is directly connected to the axial cooling channels of the rotor to deliver coolant to the axial cooling channels of the rotor, and a larger opening, which is non-rotatably connected to and encloses the first blade ring, and
    wherein the second blade ring is firmly attached at an outer circumference of the funnel-shaped tube to deliver the coolant to the stator.

2. The electric machine of claim 1, wherein the first blade ring comprises blades extending in the axial direction on a side facing the rotor.

3. The electric machine of claim 1, wherein the first blade ring is non-rotatably connected to the shaft.

4. The electric machine of claim 1, wherein the larger opening of the funnel-shaped tube operates as an intake for the coolant and is directly connected to an inflow nozzle, through which the coolant is supplied to the first and the second blade ring.

5. The electric machine of claim 1, wherein the stator comprises a laminated stator core having radial cooling channels which communicate with the radial cooling channels of the rotor.

6. The electric machine of claim 1, wherein the stator has a winding overhang, to which coolant is delivered directly by the second blade ring.

7. The electric machine of claim 4, further comprising a housing, with the inflow nozzle directing an externally supplied coolant exclusively to the axial fan.

8. The electric machine of claim 1, comprising two axial fans disposed on opposite end sides of the rotor.

* * * * *